US012567776B2

(12) United States Patent
Chowdhury et al.

(10) Patent No.: US 12,567,776 B2
(45) Date of Patent: Mar. 3, 2026

(54) SEGMENTED INTERIOR PERMANENT MAGNET ELECTRIC MACHINE

(71) Applicant: GM Global Technology Operations LLC, Detroit, MI (US)

(72) Inventors: Mazharul Chowdhury, Canton, MI (US); Le Chang, Shelby Township, MI (US); William Robert Jensen, Walled Lake, MI (US); Mohammad F. Momen, Rochester Hills, MI (US); Alan Del Rio, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 290 days.

(21) Appl. No.: 18/361,289

(22) Filed: Jul. 28, 2023

(65) Prior Publication Data

US 2025/0038595 A1     Jan. 30, 2025

(51) Int. Cl.
    *H02K 1/276*     (2022.01)
    *H02K 7/00*     (2006.01)

(52) U.S. Cl.
    CPC ........... *H02K 1/2766* (2013.01); *H02K 7/006* (2013.01)

(58) Field of Classification Search
None
See application file for complete search history.

(56) References Cited

U.S. PATENT DOCUMENTS 8,072,108 B2 * 12/2011 Finkle .................... H02K 1/276
    310/156.38
8,400,038 B2 * 3/2013 Smith .................. H02K 1/2766
    310/156.43

2004/0217723 A1 * 11/2004 Cai ...................... F02N 11/0866
    318/268
2006/0103254 A1 * 5/2006 Horst ..................... H02K 21/16
    310/156.53
2007/0108861 A1 * 5/2007 Aoyama ................ H02K 1/276
    310/156.53

(Continued)

FOREIGN PATENT DOCUMENTS

CN      105958690 A * 9/2016 ............. H02K 21/02
CN      106329774 A * 1/2017 ........... H02K 1/2766

(Continued)

OTHER PUBLICATIONS

Translated JP-2014155242-A (Year: 2025).*
German Office Action for German Application No. 102023128163.1; dated Feb. 28, 2025; 8 pages.

*Primary Examiner* — James A Shriver, II
*Assistant Examiner* — Ian Bryce Shelton
(74) *Attorney, Agent, or Firm* — CANTOR COLBURN LLP

(57) ABSTRACT

An interior permanent magnet electric machine includes a stator and a rotor. The rotor features a rotor core with slots extending between its opposite ends. These slots contain a segmented magnet assembly, which includes magnet segments of different magnetic materials. The segmented magnet assembly may be divided radially, axially, circumferentially or combinations thereof and may include outer magnet segments made of the first magnetic material and inner magnet segments made of the second magnetic material. Additionally, the segmented magnet assembly includes magnetic poles that are aligned in radial, axial, or circumferential directions.

14 Claims, 5 Drawing Sheets

(56) References Cited

U.S. PATENT DOCUMENTS

| | | | | |
|---|---|---|---|---|
| 2007/0284960 A1* | 12/2007 | Fulton | ................... | H02K 1/278 |
| | | | | 310/156.01 |
| 2010/0171386 A1* | 7/2010 | Kogure | ................. | H02K 1/276 |
| | | | | 310/156.43 |
| 2011/0080066 A1* | 4/2011 | Doi | ....................... | H02K 1/276 |
| | | | | 310/156.43 |
| 2011/0101815 A1* | 5/2011 | Finkle | ................... | H02K 1/276 |
| | | | | 310/191 |
| 2014/0339945 A1* | 11/2014 | Fiseni | ................ | H02K 1/2766 |
| | | | | 29/598 |
| 2017/0179779 A1* | 6/2017 | Kaiser | ................ | H02K 1/2766 |
| 2018/0053586 A1* | 2/2018 | Rong | .................. | H01F 1/0579 |
| 2019/0068008 A1* | 2/2019 | Gao | ....................... | H02K 1/02 |
| 2019/0207446 A1* | 7/2019 | Swales | ................. | H02K 16/02 |
| 2020/0313475 A1* | 10/2020 | Fatemi | ................... | H02K 3/28 |
| 2020/0395800 A1* | 12/2020 | Rong | ................... | H02K 21/14 |

FOREIGN PATENT DOCUMENTS

| | | | | | |
|---|---|---|---|---|---|
| CN | 108667176 A | * | 10/2018 | ............. | H02K 1/02 |
| CN | 113014009 A | | 6/2021 | | |
| DE | 112008001333 T5 | * | 4/2010 | ............ | H02K 1/276 |
| JP | 2014155242 A | * | 8/2014 | | |

* cited by examiner

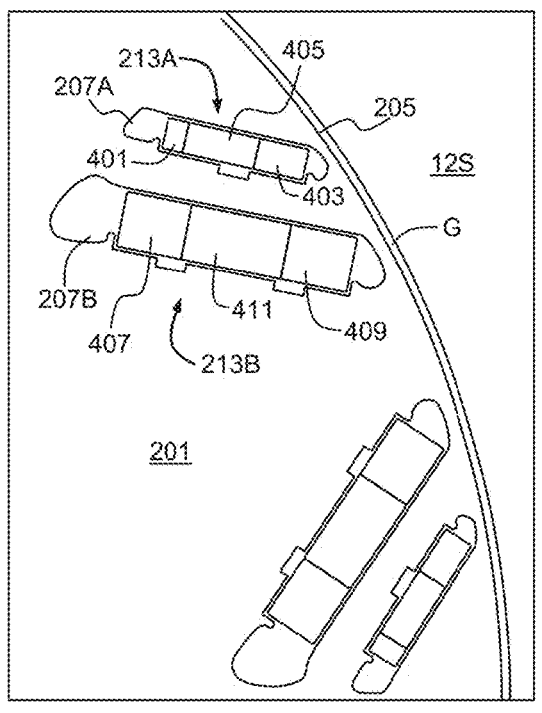
FIG. 4A
FIG. 4B
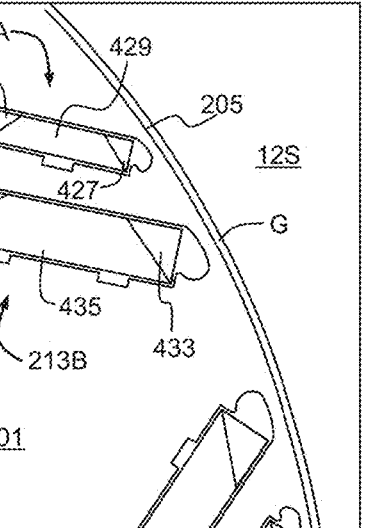
FIG. 4C

SEGMENTED INTERIOR PERMANENT MAGNET ELECTRIC MACHINE

INTRODUCTION

The disclosure relates to interior permanent magnet (IPM) electric machines. More particularly, the disclosure relates to magnetic pole arrangements in IPM electric machines.

High output electric machines, such as IPM alternating current (AC) machines used in electrified vehicle powertrains, may employ rare earth magnets such as neodymium and samarium cobalt magnets. Enhanced neodymium magnetic properties, such as higher resistance to demagnetization (coercivity), improved temperature stability, or better performance at extreme conditions may be achieved by the addition of heavy rare earth (HRE) elements include dysprosium (Dy), terbium (Tb), and gadolinium (Gd), among others. HRE magnets may be sensitive to supply volatility of the HRE elements. Some relief from HRE supply volatility factors may come from material domain improvements such as boundary diffusion processes minimizing material requirements. Due to HRE supply volatility factors and others, it is generally desirable to reduce the HRE content of such magnets.

SUMMARY

In one exemplary embodiment, an interior permanent magnet electric machine may include a rotor core having axially opposite ends and a plurality of slots, each slot extending through the rotor core between the axially opposite ends and containing a segmented magnet assembly including at least one magnet segment of a first magnetic material and at least one magnet segment of a second magnetic material.

In addition to one or more of the features described herein, the segmented magnet assembly is segmented in a radial direction relative to a rotational axis of the rotor core.

In addition to one or more of the features described herein, the segmented magnet assembly comprises radially outer magnet segments of the first magnetic material at radial ends of the segmented magnet assembly and at least one inner magnet segment of the second magnetic material being radially between the radially outer magnet segments of the first magnetic material.

In addition to one or more of the features described herein, the first magnetic material comprises a heavy rare earth magnetic material and the second magnetic material comprises a non-heavy rare earth magnetic material.

In addition to one or more of the features described herein, the segmented magnet assembly is segmented in an axial direction relative to a rotational axis of the rotor core.

In addition to one or more of the features described herein, the segmented magnet assembly may include axially outer magnet segments of the first magnetic material at axial ends of the segmented magnet assembly and at least one inner magnet segment of the second magnetic material being axially between the axially outer magnet segments of the first magnetic material.

In addition to one or more of the features described herein, the first magnetic material may include a heavy rare earth magnetic material and the second magnetic material comprises a non-heavy rare earth magnetic material.

In addition to one or more of the features described herein, the segmented magnet assembly is segmented in a circumferential direction relative to a rotational axis of the rotor core.

In addition to one or more of the features described herein, the segmented magnet assembly may include magnetic poles aligned in an axial direction relative to a rotational axis of the rotor core.

In addition to one or more of the features described herein, the segmented magnet assembly may include magnetic poles aligned in a radial direction relative to a rotational axis of the rotor core.

In addition to one or more of the features described herein, the segmented magnet assembly may include magnetic poles aligned in a circumferential direction relative to a rotational axis of the rotor core.

In addition to one or more of the features described herein, the first magnetic material may include a heavy rare earth magnetic material and the second magnetic material comprises a non-heavy rare earth magnetic material.

In addition to one or more of the features described herein, the segmented magnet assembly may further include axially outer magnet segments of the first magnetic material at axial ends of the segmented magnet assembly and the at least one inner magnet segment of the second magnetic material being axially between the axially outer magnet segments of the first magnetic material.

In addition to one or more of the features described herein, the first magnetic material may include a heavy rare earth magnetic material and the second magnetic material comprises a non-heavy rare earth magnetic material.

In addition to one or more of the features described herein, at least one of the radially outer magnet segments of the first magnetic material at radial ends of the segmented magnet assembly and the at least one inner magnet segment of the second magnetic material are trapezoidally shaped.

In addition to one or more of the features described herein, at least one of the radially outer magnet segments of the first magnetic material at radial ends of the segmented magnet assembly is triangularly shaped.

In another exemplary embodiment, an interior permanent magnet electric machine may include a stator and a rotor including a rotor core having axially opposite ends and a plurality of slots, each slot extending through the rotor core between the axially opposite ends and containing a segmented magnet assembly including at least one magnet segment of a first magnetic material and at least one magnet segment of a second magnetic material, wherein the segmented magnet assembly is segmented in a radial direction relative to a rotational axis of the rotor core and includes radially outer magnet segments of the first magnetic material at radial ends of the segmented magnet assembly and at least one inner magnet segment of the second magnetic material being radially between the radially outer magnet segments of the first magnetic material, the segmented magnet assembly further including magnetic poles aligned in a circumferential direction relative to the rotational axis of the rotor core.

In addition to one or more of the features described herein, the first magnetic material may include a heavy rare earth magnetic material and the second magnetic material comprises a non-heavy rare earth magnetic material.

In addition to one or more of the features described herein, the first magnetic material may include a non-heavy rare earth magnetic material and the second magnetic material comprises a heavy rare earth magnetic material.

In yet another exemplary embodiment, an electrified powertrain for a vehicle may include a battery pack, a traction power inverter module ("TPIM") connected to the battery pack, and configured to change a direct current ("DC") voltage from the battery pack to an alternating current ("AC") voltage, and a rotary electric machine including a stator energized by the AC voltage from the TPIM, a rotor including a rotor core having axially opposite ends and a plurality of slots, each slot extending through the rotor core between the axially opposite ends and containing a segmented magnet assembly including at least one magnet segment of a first magnetic material and at least one magnet segment of a second magnetic material, wherein the segmented magnet assembly is segmented in a radial direction relative to a rotational axis of the rotor core and includes radially outer magnet segments of the first magnetic material at radial ends of the segmented magnet assembly and at least one inner magnet segment of the second magnetic material being radially between the radially outer magnet segments of the first magnetic material, the segmented magnet assembly further including magnetic poles aligned in a circumferential direction relative to the rotational axis of the rotor core, a rotor shaft connected to the rotor, and configured to rotate about an axis of rotation in conjunction with the rotor when the stator is energized, and a transmission coupled to the rotor shaft and powered by the electric machine.

BRIEF DESCRIPTION OF THE DRAWINGS

Other features, advantages and details appear, by way of example only, in the following detailed description, the detailed description referring to the drawings in which:

FIGS. 4A-4C illustrate an end view of a rotor including a rotor core and segmented interior permanent magnets, in accordance with one or more embodiments.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

Figure 1:
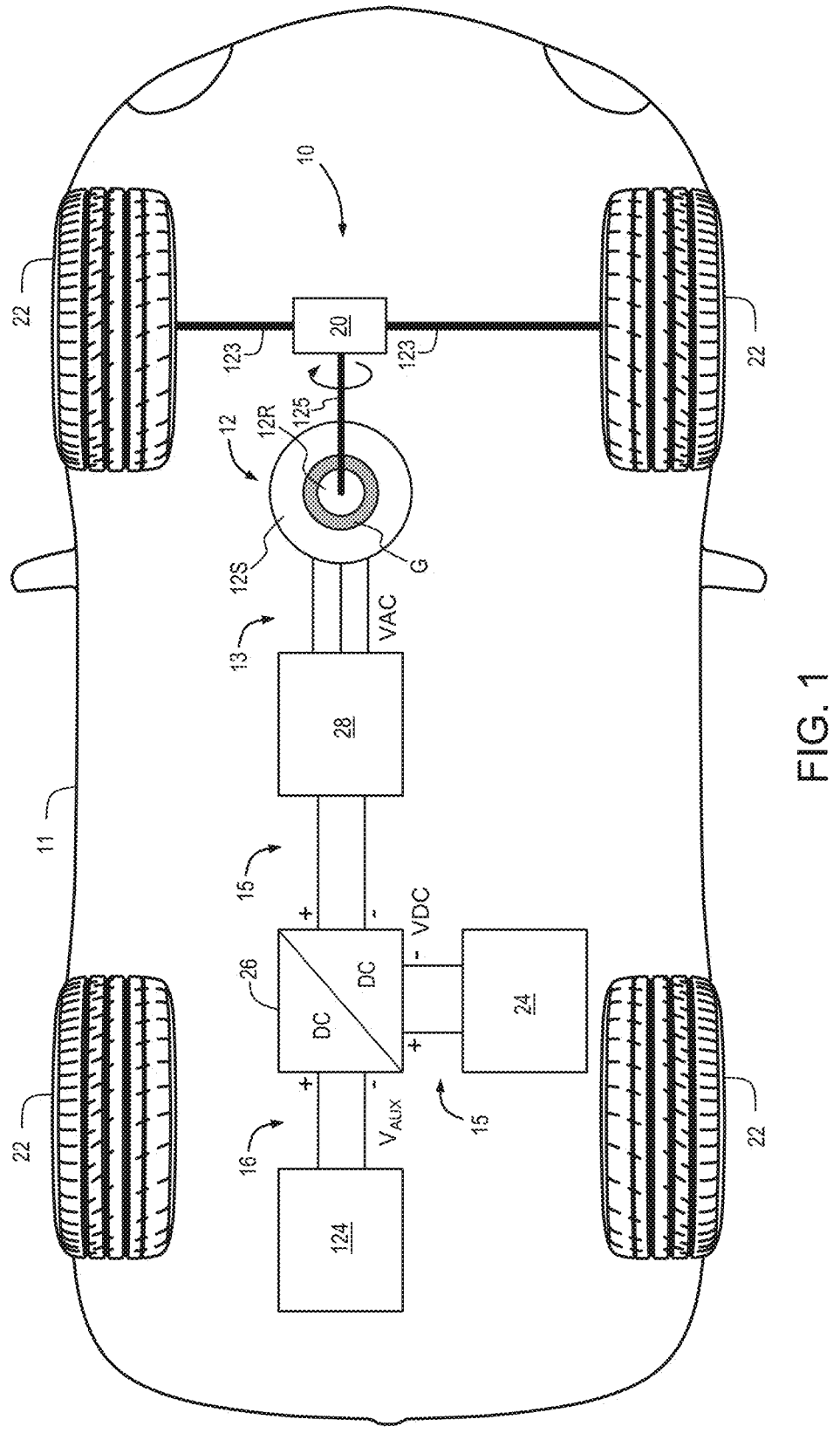
FIG. 1 illustrates an electrified powertrain, in accordance with one or more embodiments.

Referring to the drawings, wherein like reference numbers refer to the same or like components in the several FIGS., an electrified powertrain 10 is depicted schematically in FIG. 1, (e.g., for use aboard an exemplary motor vehicle 11.) The powertrain 10 includes a rotary electric machine 12 having a rotor 12R and a stator 12S. The rotor 12R may include interior permanent magnets. When the stator 12S is energized, the rotor 12R supplies motor torque to a transmission 20, (e.g., a stepped-gear automatic transmission.) Although omitted for illustrative simplicity, the electrified powertrain 10 may also include an internal combustion engine configured to generate engine torque. When so equipped, the generated engine torque may be selectively provided to the transmission 20, either alone or in conjunction with the motor torque from the electric machine 12.

When the vehicle 11 of FIG. 1 is embodied as a hybrid electric vehicle, the electric machine 12 and/or the engine may power the transmission 20. Alternatively, the vehicle 11 may be a battery electric vehicle, in which case the transmission 20 may be powered solely by the motor torque from the electric machine 12. The disclosed improvements relate to the construction of the electric machine 12, and may be realized in hybrid electric vehicle (HEV) and electric vehicle (EV) embodiments of the vehicle 11 without limitation, as well as in non-vehicular applications such as power plants, hoists, mobile platforms and robots, etc. While the electric machine 12 is described as a rotary electric machine, certain applications such as rail propulsion systems may employ linear electric machines where the rotor may be embodied in a linear equivalent with interior permanent magnets as is known in the art.

With continued reference to the exemplary vehicle 11 of FIG. 1, the electrified powertrain 10 may include an alternating current (AC) voltage bus 13. The AC voltage bus 13 may be selectively energized via a traction power inverter module (TPIM) 28 that is DC coupled to a high-voltage (HV) battery pack 24, for instance a lithium ion, lithium sulfur, nickel metal hydride, or other high-energy voltage supply. The AC voltage bus 13 provides an AC bus voltage (VAC) and conducts AC current to or from the electric machine 12. The motor torque from the energized electric machine 12, when operating in a drive or motoring mode, is imparted to a rotor shaft 125 of the rotor 12R, with the rotor shaft 125 journaled, splined, or otherwise connected to the rotor 12R. The motor torque is then directed to a coupled load, such as the transmission 20 and/or one or more road wheels 22.

The HV battery pack may be DC coupled to the TPIM 28 via a relatively high DC voltage bus (e.g., DC link) 15 at a relatively high DC voltage (VDC). The electrified powertrain 10 may also include a DC-DC converter 26 configured to reduce or increase a relatively high DC bus voltage VDC as needed. The DC-DC converter 26 is connected between the battery pack 24 and a relatively low DC voltage bus 16. In some configurations, an auxiliary battery pack 124 may be connected to the DC-DC converter 26 across the relatively low DC voltage bus 16. The auxiliary battery pack 124 may be embodied as a lead-acid battery or a battery constructed of another application-suitable chemistry and configured to store or supply, for example, a 12-15V auxiliary voltage (VAUX) to one or more connected auxiliary devices (not shown).

The rotor 12R of the electric machine 12 is positioned adjacent to the stator 12S and separated therefrom by an airgap. The stator 12S and the rotor 12R may be constructed from a stack-up of thin laminations, (e.g., electrical steel or another ferrous material, with each lamination typically being about 0.2 mm-0.5 mm thick as will be appreciated by those of ordinary skill in the art.) Laminations may be cut to their finished shape by a punch and die or may be cut by a laser, or by wire electrical discharge machining.

The rotor 12R shown schematically in FIG. 1 includes internal rotor slots characterized by voids in the electrical steel of the laminations. Such rotor slots may provide a flux barrier internal to the rotor 12R and may contain other rotor features as further described herein. In accordance with certain embodiments, the rotor slots may be partially or completely filled with permanent magnets (PM).

Figure 2:
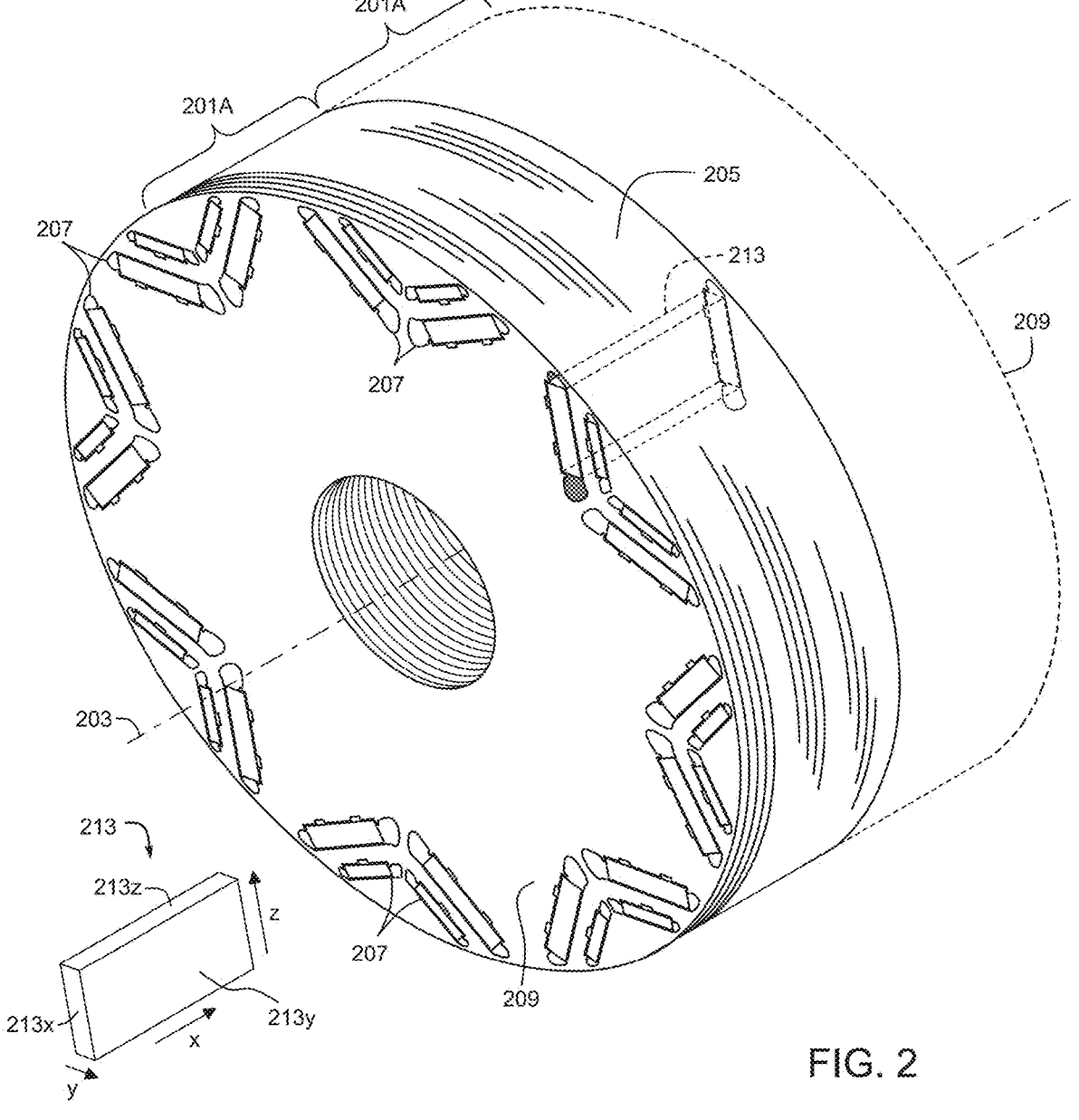
FIG. 2 illustrates various features of an interior permanent magnet rotor, in accordance with one or more embodiments.

FIG. 2 depicts an exemplary rotor core 201 of the rotor 12R of FIG. 1 in accordance with an interior permanent magnet (IPM) rotary machine. The rotor core 201 may be constructed from a stack-up of thin laminations, (e.g., electrical steel or another ferrous material, with each lamination typically being about 0.2 mm-0.5 mm thick as will be appreciated by those of ordinary skill in the art). A complete rotor core 201 may include multiple sub-cores 201A or a single stack of laminations. Reference herein to a rotor core may refer to multiple sub-cores 201A or a single stack of laminations. Laminations may be cut to their finished shape by a punch and die or may be cut by a laser, or by wire electrical discharge machining. The rotor core 201 may be alternatively fabricated, for example mold formed from sintered powdered metal and binders under heat and pressure, also as multiple sub-cores or a single mold formed structure. As depicted in FIG. 1, the stator according to a non-limiting exemplary embodiment is arranged concentrically around the rotor 12R such that the rotor 12R is surrounded by the stator 12S. In such an embodiment, the airgap G is a radial airgap and the electric machine 12 embodies a radial flux-type machine. However, other embodiments of rotary electric machines may be realized in which the relative positions of the rotor 12R and stator 12S are reversed (i.e., interior stator) or the air gap is axial for example. For illustrative consistency, the embodiment of FIG. 1 in which the rotor 12R resides radially within the stator 12S will be described herein without limiting the construction to such a configuration.

Figure 5:
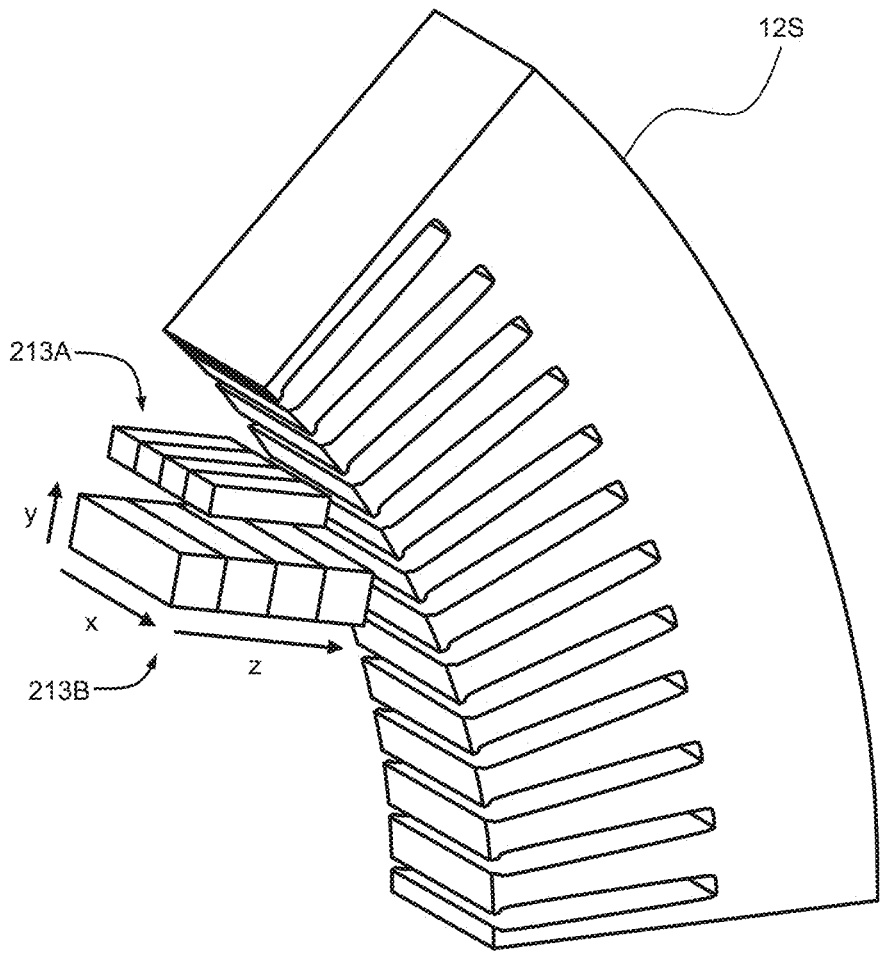
FIG. 5 illustrates alternate embodiments of segmented magnet assemblies, in accordance with one or more embodiments.

The stator 12S of FIG. 1 may include radially-projecting stator teeth extending inward from a cylindrical stator core as depicted in FIG. 5. That is, the stator teeth extend toward the rotor 12R from the stator core. The inner diameter surface of the stator 12S is the radially-innermost surface of the stator teeth facing or opposing the outer peripheral surface 205 of the rotor 12R in spaced adjacency to form the air gap G as depicted in FIG. 1. Adjacent stator teeth are separated from each other by a corresponding stator slot, as will be appreciated by those of ordinary skill in the art. The stator slots enclose electrical conductors, typically copper wires, copper bars, or hairpin conductor. Such conductors collectively form stator windings. A rotating stator magnetic field is generated when the stator windings are sequentially-energized by a polyphase output voltage from the TPIM 28 depicted in FIG. 1. Stator magnetic poles formed from the resulting rotating stator magnetic field interact with rotor poles to rotate the rotor 12R around the rotational axis 203 of the rotor core 201.

In the IPM rotary machine embodiment of FIG. 2, the rotor core 201 may include a number of slots 207 extending axially through the rotor core 201 between opposite ends 209 of the rotor core 201. The slots may be substantially aligned axially between the opposite ends 209 of the rotor core though the actual alignment may be skewed as is known in the art. When viewed along the rotational axis 203 (such as in FIGS. 4A-4C), the slots 207 may be elongated with a skewed alignment relative to a true radial alignment as is known in the art. Reference herein to radial alignment or substantial radial alignment of slots or permanent magnets is understood to refer to true radial alignment or a skewed radial alignment as known to those skilled in the art. In an embodiment as depicted in the FIGS., slots 207 may be arranged with adjacent pairs in a "V" pattern. In an embodiment as depicted in the FIGS., inner and outer "V" patterns of slots 207 may be employed with smaller slots 207 closer to the outer peripheral surface 205 of the rotor core 201 and larger slots 207 closer to the rotational axis 203 of the rotor core 201. In an embodiment, each slot 207 may contain a permanent magnet assembly 213. A permanent magnet assembly 213 may be continuous or segmented through the axial length of the respective slots 207 from one end of the rotor core 201 to the other end of the rotor core. In an embodiment, each sub-core 201A may include a respective permanent magnet assembly 213.

The permanent magnet assemblies 213 may be collectively referred to herein as rotor magnets and may be constructed, for example, of rare earth magnets such as neodymium and samarium cobalt magnets and heavy rare earth (HRE) magnets. As used herein, HRE magnets are understood to include heavy rare earth elements (e.g., dysprosium (Dy), terbium (Tb), and gadolinium (Gd), among others), whereas non-HRE (NHRE) magnets are understood to include no heavy rare earth elements. The permanent magnet assemblies 213 may be embedded within respective slots 207 within the stack of individual steel laminations of the rotor core 201. The number, type, position, and/or relative orientation of the rotor magnets ultimately influences the magnitude and distribution of magnetic flux in the ferrous materials of the electric machine 12. In an embodiment, the poles of the rotor magnets may be axially aligned between axial ends 213$x$ (axial x-axis). In an embodiment, the poles of the rotor magnets may be circumferentially aligned between circumferential ends 213$y$ (circumferential y-axis). In an embodiment, the poles of the rotor magnets may be radially aligned between radial ends 213$z$ (radial z-axis).

Figures 3A, 3B, 3C, 3D, 3E:
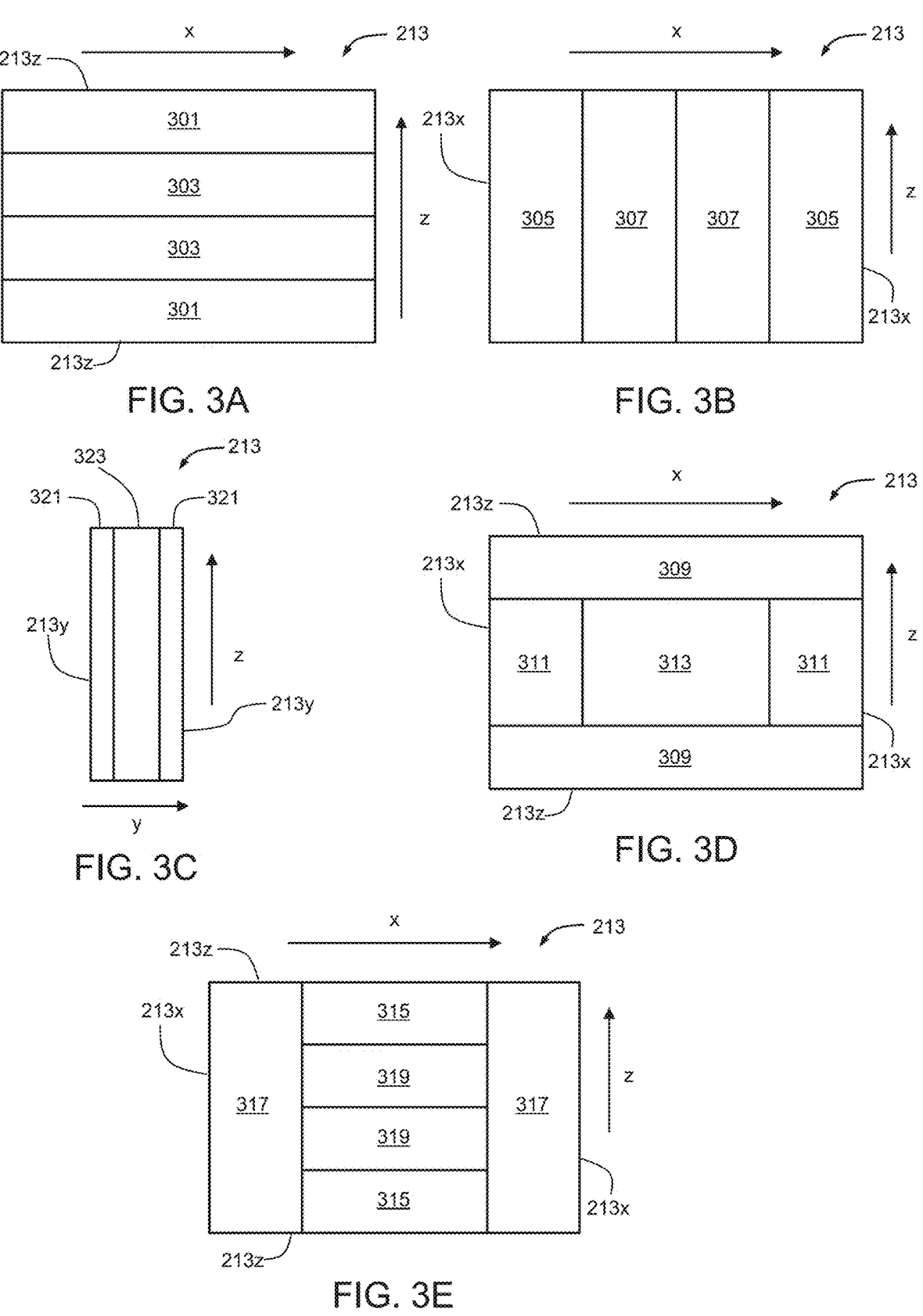
FIGS. 3A through 3E illustrate various embodiments of segmented magnet assemblies, in accordance with one or more embodiments.

FIGS. 3A-3E depict various embodiments of magnet assemblies 213 configured using magnet segments fabricated from different magnetic materials. Any segmented magnet assembly 213 may include at least two magnet segments of different magnetic materials, for example one neodymium magnet segment and one samarium cobalt magnet segment, or one HRE magnet segment and one NHRE magnet segment, or one neodymium magnet segment, one samarium cobalt magnet segment and one HRE magnet segment. FIG. 3A illustrates an embodiment of a magnet assembly 213 segmented radially along the radial z-axis as depicted. In the illustrated embodiment, four magnet segments are shown as exemplary though two or more magnet segments may make up any given segmented magnet assembly 213. In an embodiment shown, there are two outer magnet segments 301 and two inner magnet segments 303. In one embodiment, for example where higher operating temperatures may be expected at the radial ends 213$z$ than at the center of the magnet assembly 213, the outer magnet segments 301 may be HRE magnet segments and the inner magnet segments 303 may be NHRE magnet segments. In another embodiment, for example where higher operating temperatures may be expected at the center of the magnet assembly 213 than at the radial ends 213$z$, the outer magnet segments 301 may be NHRE magnet segments and the inner magnet segments 303 may be HRE magnet segments.

FIG. 3B illustrates an embodiment of a magnet assembly 213 segmented axially along the axial x-axis as depicted. In the illustrated embodiment, four magnet segments are shown as exemplary though two or more magnet segments may make up any given segmented magnet assembly 213. In an embodiment shown, there are two outer magnet segments 305 and two inner magnet segments 307. In one embodiment, for example where higher operating temperatures may be expected at the axial ends 213$x$ than at the center of the magnet assembly 213, the outer magnet segments 305 may be HRE magnet segments and the inner magnet segments 307 may be NHRE magnet segments. In another embodiment, for example where higher operating temperatures may be expected at the center of the magnet assembly 213 than at the axial ends 213x, the outer magnet segments 305 may be NHRE magnet segments and the inner magnet segments 307 may be HRE magnet segments.

FIG. 3C illustrates an embodiment of a magnet assembly 213 segmented circumferentially along the circumferential y-axis as depicted. In the illustrated embodiment, three magnet segments are shown as exemplary though two or more magnet segments may make up any given segmented magnet assembly 213. In an embodiment shown, there are two outer magnet segments 321 and one inner magnet segment 323. In one embodiment, for example where higher operating temperatures may be expected at the circumferential ends 213y than at the center of the magnet assembly 213, the outer magnet segments 321 may be HRE magnet segments and the inner magnet segment 323 may be an NHRE magnet. In another embodiment, for example where higher operating temperatures may be expected at the center of the magnet assembly 213 than at the circumferential ends 213y, the outer magnet segments 321 may be NHRE magnet segments and the inner magnet segment 323 may be an HRE magnet segment.

FIG. 3D illustrates an embodiment of a magnet assembly 213 segmented both radially along the radial z-axis and axially along the axial x-axis as depicted. In the illustrated embodiment, five magnet segments are shown as exemplary. In an embodiment shown, there are two outer magnet segments 309 at the radial ends 213z, two outer magnet segments 311 at the axial ends 213x, and one inner magnet segment 313. In one embodiment, for example where higher operating temperatures may be expected at the radial ends 213z and the axial ends 213x than at the center of the magnet assembly 213, the outer magnet segments 309 and 311 may be HRE magnet segments and the inner magnet segment 313 may be an NHRE magnet segment. In another embodiment, for example where higher operating temperatures may be expected at the center of the magnet assembly 213 than at the radial ends 213z and the axial ends 213x, the outer magnet segments 309 and 311 may be NHRE magnet segments and the inner magnet segment 313 may be an HRE magnet segment.

FIG. 3E illustrates an embodiment of a magnet assembly 213 segmented both radially along the radial z-axis and axially along the axial x-axis as depicted. In the illustrated embodiment, five magnet segments are shown as exemplary. In an embodiment shown, there are two outer magnet segments 315 at the radial ends 213z, two outer magnet segments 317 at the axial ends 213x, and two inner magnet segments 319. In one embodiment, for example where higher operating temperatures may be expected at the radial ends 213z and the axial ends 213x than at the center of the magnet assembly 213, the outer magnet segments 315 and 317 may be HRE magnet segments and the inner magnet segments 319 may be NHRE magnet segments. In another embodiment, for example where higher operating temperatures may be expected at the center of the magnet assembly 213 than at the radial ends 213z and the axial ends 213x, the outer magnet segments 315 and 317 may be NHRE magnet segments and the inner magnet segments 319 may be HRE magnet segments.

FIGS. 4A-4C illustrate an end view of a rotor including the rotor core 201 depicted in FIG. 2 observed along the rotational axis 203 and in relation to the stator 12S and air gap G. FIGS. 4A-4C depict various embodiments of magnet assemblies 213 assembled within the respective slots 207 and segmented radially along the respective radial z-axes as depicted. Smaller slots 207A closer to the outer peripheral surface 205 of the rotor core 201 and larger slots 207B closer to the rotational axis 203 of the rotor core 201 are shown. FIGS. 4A-4C illustrate embodiments of corresponding magnet assemblies 213 segmented radially along the radial z-axis as depicted in both the smaller slots 207A and the larger slots 207B.

In FIG. 4A, the magnet assembly 213A corresponding to the smaller slot 207A and the magnet assembly 213B corresponding to the larger slot 207B each include three magnet segments as exemplary. In an embodiment shown, the magnet assembly 213A includes two outer magnet segments 401 and 403 and one inner magnet segment 405 within the smaller slot 207A. Similarly, the magnet assembly 213B includes two outer magnet segments 407 and 409 and one inner magnet segment 411 within the larger slot 207B. In one embodiment as depicted with the magnet assembly 213A, the outer magnet segments 401 and 403 and the inner magnet segment 405 may all be rectangularly shaped in cross section and have different cross sectional sizes. The inner magnet segment 405 is also rectangular in cross section. The outer magnet segments 401 and 403 may be different sizes and neither is the size of the inner magnet segment 405. In one embodiment as depicted with the magnet assembly 213B, the outer magnet segments 407 and 409 and the inner magnet segment 411 may all be rectangularly shaped in cross section. Both outer magnet segments 407 and 409 may be the same size and smaller than the inner magnet segment 411.

In FIG. 4B, the magnet assembly 213A corresponding to the smaller slot 207A and the magnet assembly 213B corresponding to the larger slot 207B also include three magnet segments as exemplary. In an embodiment shown, the magnet assembly 213A also includes two outer magnet segments 413 and 415 and one inner magnet segment 417 within the smaller slot 207A. Similarly, the magnet assembly 213B includes two outer magnet segments 419 and 421 and one inner magnet segment 423 within the larger slot 207B. In one embodiment as depicted with the magnet assembly 213A, the outer magnet segments 413 and 415 and the inner magnet segment 417 may all be trapezoidally shaped in cross section and have different cross-sectional sizes. The outer magnet segments 413 and 415 may be different sizes. In one embodiment as depicted with the magnet assembly 213B, the outer magnet segments 419 and 421 and the inner magnet segment 411 may all be trapezoidally shaped in cross section. Both outer magnet segments 419 and 421 may be the same size.

In FIG. 4C, the magnet assembly 213A corresponding to the smaller slot 207A and the magnet assembly 213B corresponding to the larger slot 207B also include three magnet segments as exemplary. In an embodiment shown, the magnet assembly 213A also includes two outer magnet segments 425 and 427 and one inner magnet segment 429 within the smaller slot 207A. Similarly, the magnet assembly 213B includes two outer magnet segments 431 and 433 and one inner magnet segment 435 within the larger slot 207B. In one embodiment as depicted with the magnet assembly 213A, the outer magnet segments 425 and 427 may be triangularly shaped in cross section and the inner magnet segment 429 may be trapezoidally shaped in cross section. The outer magnet segments 425 and 427 may be the same size as depicted or different sizes. In one embodiment as depicted with the magnet assembly 213B, the outer magnet segments 431 and 433 may be triangularly shaped in cross section and the inner magnet segment 435 may be trapezoidally shaped in cross section. Both outer magnet segments 419 and 421 may be the same size.

FIG. 5 depicts an embodiment of a magnet assembly 213A and a magnet assembly 213B without the rotor core for illustration purposes. The magnet assembly 213A corresponds to a small slot in the rotor core and the magnet assembly 213B corresponds to a large slot in the rotor core. The magnet assembly 213A corresponds to an embodiment of a magnet assembly segmented axially along the axial x-axis as depicted in FIG. B. The magnet assembly 213B corresponds to an embodiment of a magnet assembly segmented radially along the radial z-axis as depicted in FIG. A. In both embodiments of magnet assembly 213A and 213B illustrated, the magnet segments are rectangularly shaped, but it is understood that other shapes such as trapezoidal and triangular as illustrated with respect to FIGS. 4B and 4C, respectively, may be employed.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An interior permanent magnet electric machine, comprising:
   a rotor core having axially opposite ends and a plurality of slots, each slot extending through the rotor core between the axially opposite ends and containing a segmented magnet assembly including at least one magnet segment of a first magnetic material and at least one magnet segment of a second magnetic material;
   wherein the first magnet material is a heavy rare earth magnet material and the second magnet material is a non-heavy rare earth magnet material; and
   wherein the rotor core defines a first zone and a second zone, the first zone having a higher expected operating temperature than the second zone, and wherein the at least one magnet segment of the first magnetic material is closer to the first zone than the at least one magnet segment of the second magnetic material.

2. The interior permanent magnet electric machine of claim 1, wherein the segmented magnet assembly is segmented in a radial direction relative to a rotational axis of the rotor core.

3. The interior permanent magnet electric machine of claim 2, wherein the segmented magnet assembly comprises radially outer magnet segments of the first magnetic material at radial ends of the segmented magnet assembly and at least one inner magnet segment of the second magnetic material being radially between the radially outer magnet segments of the first magnetic material.

4. The interior permanent magnet electric machine of claim 1, wherein the segmented magnet assembly is segmented in an axial direction relative to a rotational axis of the rotor core.

5. The interior permanent magnet electric machine of claim 4, wherein the segmented magnet assembly comprises axially outer magnet segments of the first magnetic material at axial ends of the segmented magnet assembly and at least one inner magnet segment of the second magnetic material being axially between the axially outer magnet segments of the first magnetic material.

6. The interior permanent magnet electric machine of claim 1, wherein the segmented magnet assembly is segmented in a circumferential direction relative to a rotational axis of the rotor core.

7. The interior permanent magnet electric machine of claim 1, wherein the segmented magnet assembly includes magnetic poles aligned in an axial direction relative to a rotational axis of the rotor core.

8. The interior permanent magnet electric machine of claim 1, wherein the segmented magnet assembly includes magnetic poles aligned in a radial direction relative to a rotational axis of the rotor core.

9. The interior permanent magnet electric machine of claim 1, wherein the segmented magnet assembly includes magnetic poles aligned in a circumferential direction relative to a rotational axis of the rotor core.

10. The interior permanent magnet electric machine of claim 3, wherein the segmented magnet assembly further comprises axially outer magnet segments of the first magnetic material at axial ends of the segmented magnet assembly and the at least one inner magnet segment of the second magnetic material being axially between the axially outer magnet segments of the first magnetic material.

11. The interior permanent magnet electric machine of claim 3, wherein at least one of the radially outer magnet segments of the first magnetic material at radial ends of the segmented magnet assembly and the at least one inner magnet segment of the second magnetic material are trapezoidally shaped.

12. The interior permanent magnet electric machine of claim 3, wherein at least one of the radially outer magnet segments of the first magnetic material at radial ends of the segmented magnet assembly is triangularly shaped.

13. An interior permanent magnet electric machine, comprising:

a stator; and a rotor including a rotor core having axially opposite ends and a plurality of slots, each slot extending through the rotor core between the axially opposite ends and containing a segmented magnet assembly including at least one magnet segment of a first magnetic material and at least one magnet segment of a second magnetic material;

wherein the segmented magnet assembly is segmented in a radial direction relative to a rotational axis of the rotor core and includes radially outer magnet segments of the first magnetic material at radial ends of the segmented magnet assembly and at least one inner magnet segment of the second magnetic material being radially between the radially outer magnet segments of the first magnetic material, the segmented magnet assembly further including magnetic poles aligned in a circumferential direction relative to the rotational axis of the rotor core; and wherein the first magnet material is a heavy rare earth magnet material and the second magnet material is a non-heavy rare earth magnet material; and wherein the rotor core defines a first zone and a second zone, the first zone having a higher expected operating temperature than the second zone, and wherein the at least one magnet segment of the first magnetic material is closer to the first zone than the at least one magnet segment of the second magnetic material.

14. An electrified powertrain for a vehicle, comprising:

a battery pack;

a traction power inverter module ("TPIM") connected to the battery pack, and configured to change a direct current ("DC") voltage from the battery pack to an alternating current ("AC") voltage; and a rotary electric machine, comprising:

a stator energized by the AC voltage from the TPIM;

a rotor including a rotor core having axially opposite ends and a plurality of slots, each slot extending through the rotor core between the axially opposite ends and containing a segmented magnet assembly including at least one magnet segment of a first magnetic material and at least one magnet segment of a second magnetic material, wherein the segmented magnet assembly is segmented in a radial direction relative to a rotational axis of the rotor core and includes radially outer magnet segments of the first magnetic material at radial ends of the segmented magnet assembly and at least one inner magnet segment of the second magnetic material being radially between the radially outer magnet segments of the first magnetic material, the segmented magnet assembly further including magnetic poles aligned in a circumferential direction relative to the rotational axis of the rotor core;

wherein the first magnet material is a heavy rare earth magnet material and the second magnet material is a non-heavy rare earth magnet material; and wherein the rotor core defines a first zone and a second zone, the first zone having a higher expected operating temperature than the second zone, and wherein the at least one magnet segment of the first magnetic material is closer to the first zone than the at least one magnet segment of the second magnetic material a rotor shaft connected to the rotor, and configured to rotate about an axis of rotation in conjunction with the rotor when the stator is energized; and a transmission coupled to the rotor shaft and powered by the electric machine.

\* \* \* \* \*